United States Patent
Kley

(10) Patent No.: US 7,514,680 B1
(45) Date of Patent: Apr. 7, 2009

(54) APPARATUS FOR MODIFYING AND MEASURING DIAMOND AND OTHER WORKPIECE SURFACES WITH NANOSCALE PRECISION

(75) Inventor: Victor B. Kley, Berkeley, CA (US)

(73) Assignee: Metadigm LLC, Berkeley, CA (US)

( * ) Notice: Subject to any disclaimer, the term of this patent is extended or adjusted under 35 U.S.C. 154(b) by 71 days.

(21) Appl. No.: 11/678,541

(22) Filed: Feb. 23, 2007

Related U.S. Application Data

(63) Continuation of application No. 11/067,609, filed on Feb. 25, 2005, now Pat. No. 7,183,548.

(60) Provisional application No. 60/623,283, filed on Oct. 28, 2004, provisional application No. 60/622,520, filed on Oct. 26, 2004, provisional application No. 60/602,413, filed on Aug. 17, 2004, provisional application No. 60/557,786, filed on Mar. 29, 2004, provisional application No. 60/554,690, filed on Mar. 19, 2004, provisional application No. 60/553,911, filed on Mar. 16, 2004, provisional application No. 60/552,280, filed on Mar. 10, 2004, provisional application No. 60/550,571, filed on Mar. 3, 2004, provisional application No. 60/547,934, filed on Feb. 25, 2004.

(51) Int. Cl.
*G01N 23/00* (2006.01)
*G21K 7/00* (2006.01)

(52) U.S. Cl. ............... 250/306; 250/310; 250/316; 250/216; 250/234; 250/235; 250/307; 73/105; 73/866.5; 73/504.15; 73/862; 356/376; 977/858; 977/871; 977/879

(58) Field of Classification Search ............... 250/306, 250/310, 216, 234, 235, 307; 73/105, 866.5, 73/504.15, 862; 356/376
See application file for complete search history.

(56) References Cited

U.S. PATENT DOCUMENTS

| | | | |
|---|---|---|---|
| 5,821,545 | A | 10/1998 | Lindsay et al. |
| 6,144,028 | A | 11/2000 | Kley |
| 6,252,226 | B1 | 6/2001 | Kley |
| 6,337,479 | B1 | 1/2002 | Kley |
| 6,339,217 | B1 | 1/2002 | Kley |
| 6,353,219 | B1 | 3/2002 | Kley |
| 6,871,527 | B2 | 3/2005 | Hansma et al. |
| 7,183,548 | B1 * | 2/2007 | Kley .................. 250/310 |

OTHER PUBLICATIONS

R. Komanduri et al., "Finishing of Silicon Nitride Balls," Oklahoma State University, Web Page at asset.okstate.edu/asset/finish.html downloaded on Feb. 8, 2005.

Physik Instrumente (PI) GmbH, "Datasheets: Options and Accessories," Web page at www.physikinstrumente.de/products/prdetail.php?secid=1-39.

Nonlinear Optics and Optoelectronics Lab, University Roma Tre (Italy), "Germanium on Silicon Near Infrared Photodetectors," Web page at optow.ele.uniroma3.it/optow_2002/labs/SiGeNIRfiles/SiGeNIR.html downloaded from Internet on Feb. 8, 2005.

(Continued)

*Primary Examiner*—Jack I Berman
*Assistant Examiner*—Meenakshi S Sahu
(74) *Attorney, Agent, or Firm*—Townsend and Townsend and Crew LLP

(57) ABSTRACT

Apparatus and techniques are provided for modifying and measuring surfaces of diamond workpieces and other workpieces with nanoscale precision. The apparatus and techniques exploit scanning probe microscopy (SPM) and atomic force microscopy (AFM) at a wide range of operating temperatures. In some embodiments, the SPM/AFM apparatus also includes an interferometric microscope and/or acoustic-wave microscope for making high-precision measurements of workpiece surfaces.

7 Claims, 3 Drawing Sheets

OTHER PUBLICATIONS

Saint-Gobain Ceramics, "ASTM F2094 $Si_3N_4$ Cerbec Ball Specifications," Web page at www.cerbec.com/TechInfo/TechSpec.as downloaded from Internet on Feb. 8, 2005.

C.R. Stoldt et al., "Novel Low-Temperature CVD Process for Silicon Carbide MEMS" (preprint), C.R. Stoldt, C. Carraro, W.R. Ashurst, M.C. Fritz, D.Gao, and R. Maboudian, Department of Chemical Engineering, University of California, Berkeley.

J.P. Sullivan et al., "Amorphous Diamond MEMS and Sensors," Sandia National Labs Report SAND2002-1755 (2002).

Tong et al. "Amorphous Silicon Carbide Films by Plasma-Enhanced Chemical Vapor Deposition" Proceedings of the IEEE Micro Electro Mechanical Systems Workshop ,Feb. 1993, Florida, p. 246.

University of Wisconsin—Stout—*Statics and Strength of Material*, (Physics 372-321 ), Topic 6.5:Pressure Vessels—Thin Wall Pressure Vessels, Web page at physics.uwstout.edu/StatStr/Statics/index.htm. downloaded on Feb. 8, 2005.

\* cited by examiner

APPARATUS FOR MODIFYING AND MEASURING DIAMOND AND OTHER WORKPIECE SURFACES WITH NANOSCALE PRECISION

CROSS-REFERENCES TO RELATED APPLICATIONS

This application is a continuation of application Ser. No. 11/067,609, filed Feb. 25, 2005, which application claims the benefit of the following nine U.S. Provisional Applications:

U.S. Provisional Patent Application No. 60/547,934 filed Feb. 25, 2004, entitled "Diamond Molding of Small and Microscale Capsules";

U.S. Provisional Patent Application No. 60/550,571 filed Mar. 3, 2005, entitled "Diamond Molding of Small and Microscale Capsules";

U.S. Provisional Patent Application No. 60/552,280 filed Mar. 10, 2005, entitled "Diamond Molding of Small and Microscale Capsules";

U.S. Provisional Patent Application No. 60/553,911 filed Mar. 16, 2005, entitled "Diamond Molding of Small and Microscale Capsules";

U.S. Provisional Patent Application No. 60/554,690 filed Mar. 19, 2004, entitled "Diamond and/or Silicon Carbide Molding of Small and Microscale or Nanoscale Capsules and Hohlraums";

U.S. Provisional Patent Application No. 60/557,786 filed Mar. 29, 2004, entitled "Diamond and/or Silicon Carbide Molding of Small and Microscale or Nanoscale Capsules and Hohlraums";

U.S. Provisional Patent Application No. 60/602,413 filed Aug. 17, 2004, entitled for "Diamond and/or Silicon Carbide Molding of Small and Microscale or Nanoscale Capsules and Hohlraums";

U.S. Provisional Patent Application No. 60/622,520 filed Oct. 26, 2004, entitled "Diamond and/or Silicon Carbide Molding of Small and Microscale or Nanoscale Capsules and Hohlraums"; and U.S. Provisional Patent Application No. 60/623,283 filed Oct. 28, 2004, entitled "Diamond and/or Silicon Carbide Molding of Small and Microscale or Nanoscale Capsules and Hohlraums."

The respective disclosures of these applications are incorporated herein by reference for all purposes.

The following U.S. patents and patent applications, including any attachments thereto, are incorporated by reference:

U.S. Pat. No. 6,144,028, issued Nov. 7, 2000, entitled "Scanning Probe Microscope Assembly and Corresponding Method for Making Confocal, Spectrophotometric, Near-Field, and Scanning Probe Measurements and Forming Associated Images from the Measurements";

U.S. Pat. No. 6,252,226, issued Jun. 26, 2001, entitled "Nanometer Scale Data Storage Device and Associated Positioning System";

U.S. Pat. No. 6,337,479, issued Jan. 8, 2002, entitled "Object Inspection and/or Modification System and Method";

U.S. Pat. No. 6,339,217, issued Jan. 15, 2002, entitled "Scanning Probe Microscope Assembly and Method for Making Spectrophotometric, Near-Field, and Scanning Probe Measurements";

U.S. Provisional Application No. 60/554,194, filed Mar. 16, 2004, entitled "Silicon Carbide Stabilizing of Solid Diamond and Stabilized Molded and Formed Diamond Structures";

U.S. patent application Ser. No. 11/046,526, filed Jan. 28, 2005, entitled "Angle Control of Multi-Cavity Molded Components for MEMS and NEMS Group Assembly"; and U.S. patent application Ser. No. 11/067,517, filed of even date herewith, entitled "Diamond Capsules and Methods of Manufacture."

RELATED DOCUMENTS INCORPORATED BY REFERENCE

The following documents provide background information related to the present application and are incorporated herein by reference:

[KOMA] R. Komanduri et al., "Finishing of Silicon Nitride Balls," Oklahoma State University, Web Page at asset (dot) okstate (dot) edu (slash) asset (slash) finish.htm (updated Aug. 21, 2003);

[MEMS] Proceedings of the IEEE Micro Electro Mechanical Systems Workshop, February 1993, Florida, p.246;

[PHYS] Physik Instrumente (PI) GmbH, "Datasheets: Options and Accessories," Web page at www (dot) physikinstrumente (dot) de (slash) products (slash) prdetail.php?secid=1-39;

[NOOL] Nonlinear Optics and Optoelectronics Lab, University Roma Tre (Italy), "Germanium on Silicon Near Infrared Photodetectors," Web page at optow (dot) ele (dot) uniroma3 (dot) it (slash) optow_2002 (slash) labs (slash) SiGeNIR files (slash) SiGeNIR.htm;

[SAIN] Saint-Gobain Ceramics, "ASTM F2094 $Si_3N_4$ Cerbec Ball Specifications," Web page at www (dot) cerbec (dot) com (slash) TechInfo (slash) TechSpec.asp;

[STOL] C. R. Stoldt et al., "Novel Low-Temperature CVD Process for Silicon Carbide MEMS" (preprint), C. R. Stoldt, C. Carraro, W. R. Ashurst, M. C. Fritz, D. Gao, and R. Maboudian, Department of Chemical Engineering, University of California, Berkeley;

[SULL] J. P. Sullivan et al., "Amorphous Diamond MEMS and Sensors," Sandia National Labs Report SAND2002-1755 (2002); and

[UWST] University of Wisconsin—Stout—*Statics and Strength of Material*, (Physics 372-321), Topic 6.5:Pressure Vessels—Thin Wall Pressure Vessels, Web page at physics (dot) uwstout (dot) edu (slash) StatStr (slash) Statics (slash) index.htm.

Copies of these documents have been made of record in the present application.

BACKGROUND OF THE INVENTION

The present invention relates in general to surface modification and measurement techniques and apparatus, and in particular to techniques and apparatus for modifying and measuring surfaces of diamond or other workpieces to nanoscale precision.

Ball bearings are conventionally made of metal or ceramic materials that can be finished to a surface smoothness with deviations on the order of tens of nanometers. Standard methods for making ball bearings include using a stamping machine to cut a ball from a wire of metal or ceramic material, then rolling the ball between plates to smooth over the rough edges left from the stamping procedure. For other applications, hollow capsules are made from glass microballoons or from hollow cylindrical wires, in much the same fashion as ball bearings. Surface roughness or smoothness is imposed by laser ablation, and surface deviations of a few nanometers to tens of nanometers, depending on the hardness and integrity of the material, are typical.

There is also interest in making ball bearings, hollow capsules and similar structures out of other materials that will allow surface finishes to a higher precision and that will also be suited for use at extreme temperatures (e.g. near absolute zero and/or above 100 K), or where extreme demands are placed on the strength and uniformity of the ball bearing or capsule. It is also sometimes desirable to provide surfaces having small-scale features (e.g., ridges, grooves or the like), and such features should be formed with micrometer or nanometer precision.

It would therefore be desirable to provide apparatus and techniques for measuring surface quality and for shaping surfaces to micrometer (μm) or nanometer (nm) precision.

BRIEF SUMMARY OF THE INVENTION

The present invention provides apparatus and techniques for modifying and measuring surfaces of diamond workpieces and other workpieces to nanoscale precision. The apparatus and techniques exploit scanning probe microscopy (SPM) and atomic force microscopy (AFM) at a wide range of operating temperatures. Surfaces that can be modified and measured using the apparatus and techniques described herein include the inner and outer surfaces of shells of synthetic diamond capsules, which can be smoothed to a maximum surface deviation from a perfectly smooth surface of, e.g., 2 nm or less, as well as surfaces where it is desired to impart a more complex shape, e.g., gear-toothed surfaces, with atomic (0.1 nm) or near-atomic (on the order of 1-10 nm) precision; surfaces such as probe tips for atomic force microscopy (AFM) and scanning probe microscopy (SPM) instruments may also be measured and modified. Further, the apparatus and techniques described herein may be used to modify and measure diamond surfaces at temperatures from near absolute zero up to 900° C. or higher.

A diamond shell or other diamond workpiece (e.g., a tip for an AFM probe) may be nanolapped at high temperatures to promote mechanical (diamond particle lap) or chemical lapping on suitable material laps, such as iron or chromium, manganese or titanium objects. Alternatively the AFM tip may incorporate a suitable chemical or mechanical lap material to provide lapping tips to interact with the workpiece. Additionally the object or lap structure may be differentially heated to provide, create, promote or enhance chemical, mechanical, acoustic, optical, or magnetic behavior, properties, crystal structure or other elements which are a function of the absolute or differential temperature of the object or a portion thereof. The object may be inspected and the tip motion informed by use of an interferometric microscope or interferometer equipped microscope (IM) whose principal optics are built into the temperature controlled region of the device.

At high temperatures the IM will be preferentially operated at one optical wavelength in a region above the color temperature of the object and system, at low temperatures the IM will be operated at one wavelength in the infrared preferably in the region in which silicon and diamond are transparent, further in the all temperature regimes the IM may be used with suitable detector(s) covering a wide band of infrared and microwave frequencies to monitor the thermal distribution in real or near real time on the object and materials which may be associated with the object like solid hydrogen, a heated nanolap or other object or structure. Finally ultrasonic standing waves may be monitored by a scanning probe microscope (SPM) and/or IM to measure minute thermal or material gradients in the sample by observing the material displacement and local wavelength variations of the standing acoustic waves.

The following detailed description together with the accompanying drawings will provide a better understanding of the nature and advantages of the present invention.

DETAILED DESCRIPTION OF THE INVENTION

To establish context for the apparatus and techniques described herein, examples of workpieces whose surfaces can be worked (measured and/or modified) in accordance with the present invention will first be described. It is to be understood, however, that the scope of the invention extends to workpieces of any material composition with arbitrarily-shaped surfaces.

Figure 1A:
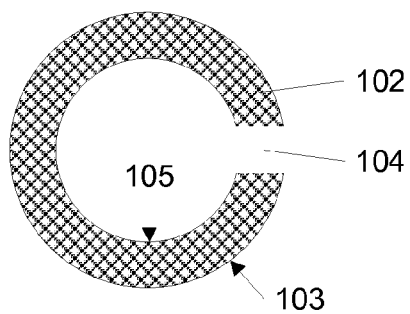
FIGS. 1A-1D are illustrations of examples of workpieces that may be worked using techniques and apparatus according to embodiments of the present invention.

FIG. 1A is a cross-sectional view of a diamond capsule shell 102. Shell 102 has an outer surface 103 that can be measured or modified at nanoscale precision using apparatus and techniques described herein. In some embodiments, an access port 104 is provided through shell 102, and the inner surface 105 of shell 102 can also be modified. Where access port 104 is not provided, inner surface 105 is generally not subject to modification by nanomachining, but inner surface 105 can still be measured using interferometric techniques described below.

Figure 1B:
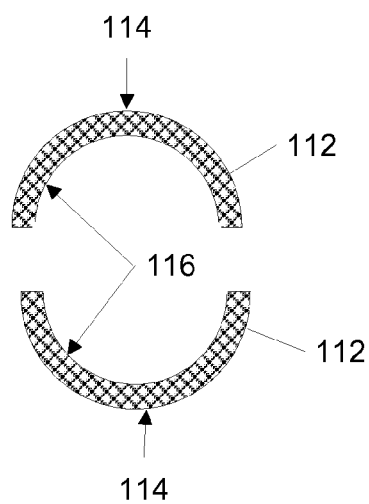

FIG. 1B is a cross-sectional view of diamond shell sections 112 that can be joined together to make a complete capsule shell. Each section 112 has an inner surface 116 and an outer surface 118, either or both of which can be measured or modified to nanoscale precision using apparatus and techniques described herein.

Figure 1C:
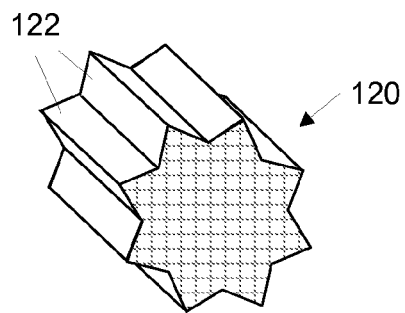

FIG. 1C is a perspective view of a cylindrical geared bearing 120. Geared bearing 120 has ridges 122 on its outer surface that, in operation, function as gear-like teeth. Using apparatus and techniques described herein, the surface of bearing 120 can be modified or measured to nanoscale precision.

Figure 1D:
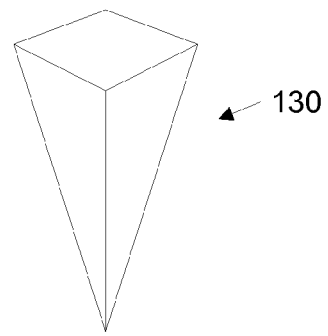

FIG. 1D is an illustration of a probe tip 130 suitable for scanning probe microscopy (SPM) or atomic force microscopy (AFM). Probe tip 130 can be manufactured from diamond as described in above-referenced application Ser. No. 11/046,526 and can then be measured and modified using techniques described herein.

In some embodiments, the workpiece is made from diamond materials, including crystalline, polycrystalline (ordered or disordered), nanocrystalline and amorphous diamond. "Diamond" refers generally to any material having a diamond lattice structure on at least a local scale (e.g., a few nanometer), and the material may be based on carbon atoms, silicon atoms, silicon carbide or any other atoms capable of forming a diamond lattice.

Figure 2A:
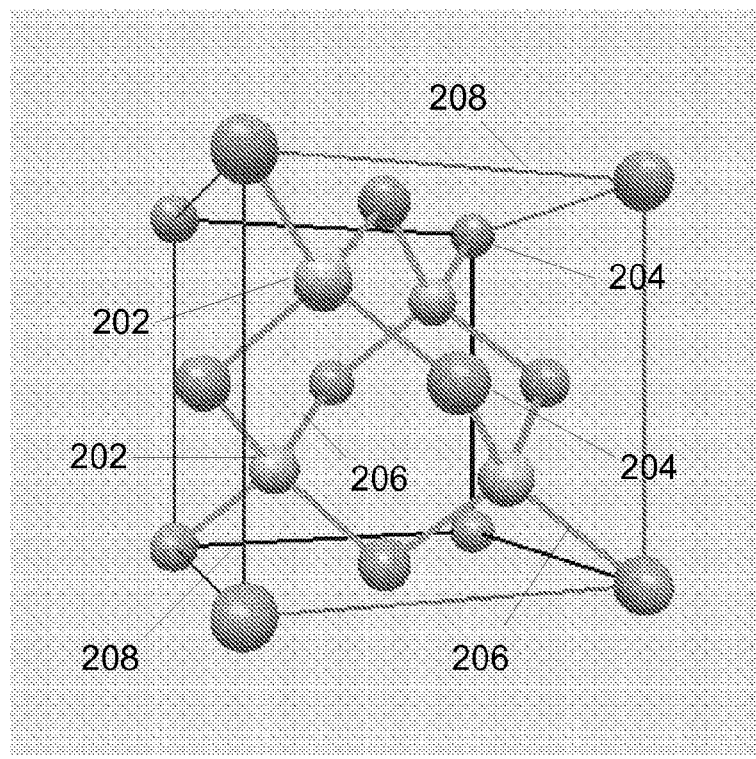
FIGS. 2A and 2B are schematic illustrations of diamond and graphite atomic lattices, respectively.

More specifically, in some embodiments, the workpiece is made of crystalline diamond. As is well known in the art, a crystal is a solid material consisting of atoms arranged in a lattice, i.e., a repeating three-dimensional pattern. In crystalline diamond, the lattice is a diamond lattice 200 as shown in FIG. 2A. Diamond lattice 200 is made up of atoms 202 connected by $sp^3$ bonds 206 in a tetrahedral configuration. (Lines 208 are visual guides indicating edges of a cube and do not represent atomic bonds.) As used herein, the term "diamond" refers to any material having atoms predominantly arranged in a diamond lattice as shown in FIG. 2A and is not limited to carbon atoms or to any other particular atoms. Thus, a "diamond shell" may include predominantly carbon atoms, silicon atoms, and/or atoms of any other type(s) capable of forming a diamond lattice, and the term "diamond" as used herein is not limited to carbon-based diamond.

In other embodiments, the workpiece can be an imperfect crystal. For example, the diamond lattice may include defects, such as extra atoms, missing atoms, or dopant or impurity atoms of a non-majority type at lattice sites; these dopant or impurity atoms may introduce non-$sp^3$ bond sites in the lattice, as is known in the art. Dopants, impurities, or other defects may be naturally occurring or deliberately introduced during fabrication of shell 102.

In still other embodiments, the workpiece is made of polycrystalline diamond. As is known in the art, polycrystalline diamond includes multiple crystal grains, where each grain has a relatively uniform diamond lattice, but the grains do not align with each other such that a continuous lattice is preserved across the boundary. The grains of a polycrystalline diamond workpiece might or might not have a generally preferred orientation relative to each other, depending on the conditions under which the workpiece is fabricated. In some embodiments, the size of the crystal grains can be controlled so as to form nanoscale crystal grains; this form of diamond is referred to as "nanocrystalline diamond." For example, the average value of a major axis of the crystal grains in nanocrystalline diamond can be made to be about 20 nm or less.

Figure 2B:
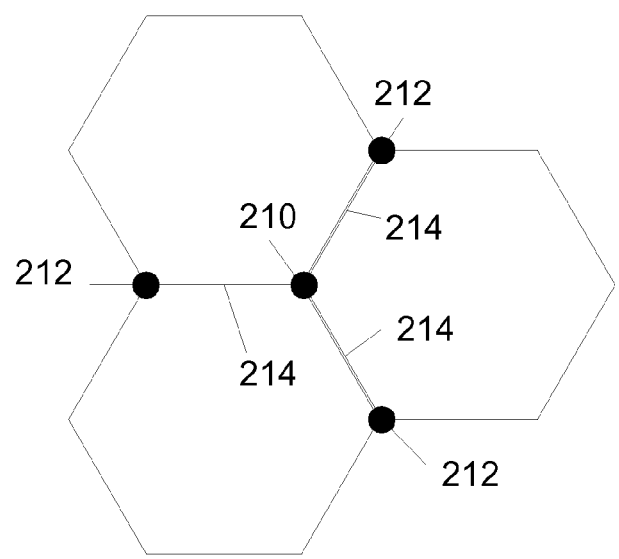

In still other embodiments, the workpiece is made of amorphous diamond. Amorphous diamond, as described in above-referenced document [SULL], does not have a large-scale diamond lattice structure but does have local (e.g., on the order of 10 nm or less) diamond structure around individual atoms. In amorphous diamond, a majority of the atoms have $sp^3$-like bonds to four neighboring atoms, and minority of the atoms are bonded to three other atoms in a $sp^2$-like bonding geometry, similar to that of graphite; FIG. 2B depicts graphite-like $sp^2$ bonds 214 between an atom 210 and three other atoms 212. The percentage of minority ($sp^2$-bonded) atoms may vary; as that percentage approaches zero over some area, a crystal grain becomes identifiable.

Thus, it is to be understood that the term "diamond material" as used herein includes single-crystal diamond, polycrystalline diamond (with ordered or disordered grains), nanocrystalline diamond, and amorphous diamond, and that any of these materials may include defects and/or dopants and/or impurities. Further, the distinctions between different forms of diamond material are somewhat arbitrary not always sharp; for example, polycrystalline diamond with average grain size below about 100 nm can be labeled nanocrystalline, and nanocrystalline diamond with grain size below about 10 nm can be labeled amorphous.

A workpiece (e.g., a capsule shell or shell section) may include multiple layers of diamond material, and different layers may have different composition. For example, some but not all layers might include a dopant; different polycrystalline oriented layers might have a different preferred orientation for their crystal grains or a different average grain size; some layers might be polycrystalline oriented diamond while others are polycrystalline disoriented, and so on. In addition, coatings or implantations of atoms that do not form diamond lattices may be included in the workpiece.

The workpiece may be fabricated as a unitary diamond structure, which may include crystalline, polycrystalline or amorphous diamond. Alternatively, the workpiece may be fabricated in sections (e.g., as shown in FIG. 1B), each of which is a unitary diamond structure, with the sections being joined together after fabrication. Examples of processes for fabricating diamond capsules are described in above-referenced application Ser. No. 11/067,517, and capsules or shells fabricated according to any of those processes may be used as workpieces in the context of the present invention.

In still other embodiments, workpieces made of materials other than diamond materials may also be worked (measured and/or modified) using techniques and apparatus in accordance with the present invention.

The workpiece may have any overall shape, including but not limited to spherical (e.g., FIG. 1A), ellipsoidal, or similar shapes. In some instances, a generally smooth workpiece (e.g., a spherical or ellipsoidal shape) may have local deviations. In other embodiments, the workpiece may have a polyhedral shape with rounded or sharp corners. Cross-sections of a workpiece in different planes may have different shapes. For example, a cylindrical capsule might have a circular cross section (similar to FIG. 1A) in a transverse plane and a rectangular cross section in a longitudinal plane.

Figure 3:
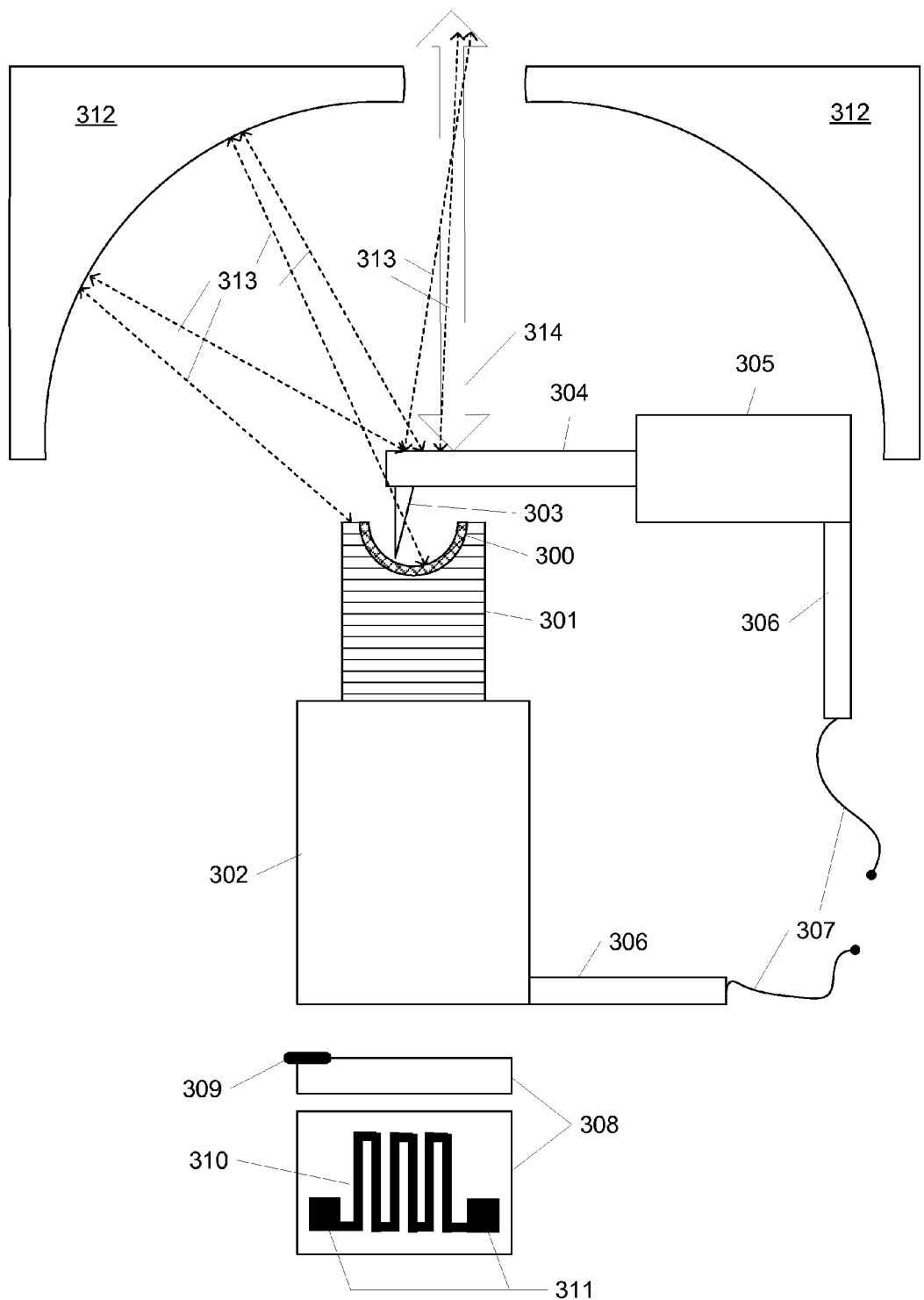
FIG. 3 is a side view of an atomic force microscopy (AFM) guided nanomachining instrument for measuring and modifying a surface of a workpiece according to an embodiment of the present invention.

FIG. 3 shows a workpiece 300 under the cutting tool of an AFM guided nanomachining instrument 301 according to an embodiment of the present invention. In this embodiment, workpiece 300 is a section of a spherical shell as shown in FIG. 1B above and may be made of polycrystalline, nanocrystalline or amorphous diamond; another material may be applied to an inner or outer surface of the shell section. It is to be understood that a different workpiece of arbitrary shape and material composition may be substituted for workpiece 300.

In this embodiment, AFM guided nanomachining is used to final machine or dress either the diamond material of workpiece 300 or its coating. The preferred embodiment of the instrument is constructed inside a thermally isolated container (not shown). The instrument includes either off the shelf piezoelectric actuators (tubes) with PTFE (Teflon) insulation or special piezoelectric actuators 305 combined with ceramic insulation 306. Special high/low temperature wire 307 is used to connect to a cantilever 304 that has a long tip 303. Tip 303 is advantageously made from single crystal diamond oriented for optimum hardness and wear resistance and is advantageously shaped so as to be usable as a cutting tool and/or probe tip.

Workpiece 300 rests on a piezoelectric sample stage 302 and is held in place by sample support/holder 301 that can be attached to sample stage 302. In one embodiment, sample support/holder 301 may be a silicon or other substrate on which workpiece 300 has been fabricated, e.g., by diamond growth on a silicon substrate; other sample supports or holders may be substituted.

The cantilever 304 is at right angles to the sample stage 302 (which itself is tiltable up to about 3° toward the cantilever base). Sample stage 302 can be used (without tilting) with a sample holder whose dimension in the direction parallel to cantilever 304 is not more than 80% of twice the cantilever length (i.e., 1.6 times the cantilever length).

In one embodiment, an interferometric microscope (IM) is implemented using cantilever 304. As shown in FIG. 3, the sample stage and scanning assembly is at least partially surrounded by a large high numerical aperture reflecting objective 312 which is focused onto the sample (e.g., the surface of workpiece 300) by movements of the sample stage 302. In one embodiment, the rays 313 illuminating the sample and returning to the objective 312 are reflected from the back side of the cantilever 304 and out through an exit aperture 315 in objective 312 to the rest of the optics, which are advantageously placed outside the thermal container of the instrument and are not shown in FIG. 3. Alternatively, rays can be reflected from a secondary reflector carried with the cantilever substrate or from a separate reflector suspended just above the cantilever by suspensions from the exit aperture 315 of the reflecting objective 312.

An AFM detection laser beam 314 is propagated to the back of the cantilever through the optically open exit 315 of objective 312. In one embodiment, the beam 314 passes through a bandpass filter (not shown in FIG. 3) that also serves as a secondary mirror. The bandpass filter is advantageously positioned on the substrate support of the cantilever 304 or suspended from the aperture 315 of objective 312. The bandpass filter has a sharp pass band around the laser wavelength and is otherwise reflective from long infrared/microwave to UV wavelengths. This arrangement permits operation of an IM (an actual interferometer formed in the microscope) and/or an imaging interferometric microscope (IIM) that can image and measure the heights of objects by sequential imaging using interferometric analysis techniques known in the art. In operation, interferometrically measured or SPM scanned irregularities or undesired elements of the sample can be removed by AFM guided nanomachining using tip 303.

In another embodiment, the system of FIG. 3 operates in conjunction with acoustic waves generated by a surface acoustic wave electrode set 309 or by a modulated laser (not shown) operating at a wavelength that creates phonons by local electromagnetic interaction with the sample surface. A suitable wavelength can be chosen based on characteristic absorption of the object or sample. Either the IM or the SPM can be used to measure the acoustic standing waves generated by electrode set 309 or a laser; conventional acoustic-wave analysis techniques allow precise detection of deviations in the surface and characterization of any thermally induced irregularities. The same system can be used at temperatures of up to 140° C. with commercially available off the shelf piezoelectric components or at higher temperatures (e.g., up to 900° C.) with special all-ceramic insulated piezoelectric components to measure, finish, nanolap, nanomachine or make additions to the sample efficiently and quickly at the elevated temperature and then return to near absolute zero without breaking vacuum. For nanolapping, inducing local thermal differentials, or using acoustic waves for measurement, an alternative sample holder 308 with a built in acoustic wave generator 309 can be connected to an external current source by pads 311. In one embodiment, acoustic wave generator 309 includes interdigitated metal lines on a layer of silicon dioxide and a thermal heater 310 (such as a nickel and chromium patterned structure)

In yet another embodiment the SPM uses a tip made of or coated with manganese, titanium, iron or other material having a carbon chemical or solubility affinity, in an appropriate shape. The SPM can be operated at a high-temperature to nanolap diamond into the an appropriate shape or correct perturbations in the diamond surface.

Surfaces that can be worked include inner and outer surfaces of diamond shells. In one embodiment, the shell is formed in sections as described in above-referenced application Ser. No. 11/067,517, and the inner and/or outer surfaces of each section are worked to the desired surface quality before the sections are assembled. The peripheral edges of the diamond shell sections can also be worked to form latch or interference members therein. Examples of such members are described in above-referenced application Ser. No. 11/067,517.

In another embodiment, the shell is formed with access ports therethrough, and the inner surface is worked using AFM-guided nanomachining with a tip having a long and narrow shape that can reach through the port to the interior. In other embodiments, the side walls of an access port can also be worked using suitable tips.

In a further embodiment, surfaces made of materials other than diamond can also be worked. For example, to work a surface of a material that is solid only at low temperatures (e.g., around 4 K), a heated tip can be used to nanolap or thermally ablate the material into a gas while the thermal container holds the work surface at the low temperature. Suitable tips can be made of diamond, titanium, platinum or other material having an affinity for the work material and are advantageously appropriately shaped to reach the work surface. For example, as described above, the work surface may be inside a diamond shell and accessible via one or more access ports (openings) through the shell. The tip can be made long and narrow enough to reach through the access port to nanolap or ablate the work material inside.

In still another embodiment, a suitably shaped tip can also be used to create an access port through a diamond shell. The access port can be created at an oblique angle through the shell or otherwise shaped such that a deformable flap of shell material can close the access port when pressure of a fluid inside the shell exceeds pressure of a fluid outside the shell, as described in above-referenced application Ser. No. 11/067, 517. Access ports can also be made with dimensions and profiles suitable for removing a form substrate material from the interior of the shell (e.g. by etching the form substrate material).

In some embodiments, it is desirable to measure the inner and outer surfaces of a hollow capsule made of diamond (or other material). For example, it may be useful to characterize the local surface roughness of either surface; the radius (in the case of a spherical capsule), major axis or other dimensions of the surface; and the relative alignment or concentricity of the inner and outer surfaces. It may further be desirable to maintain or obtain a particular concentricity (or alignment) limit or to intentionally create a precise concentricity (or alignment) offset between the surfaces.

In the case of a spherical capsule, where the capsule wall is optically transparent (e.g., in the wavelength domain 20 microns to 10 nanometers for carbon-based diamond), this measurement may be made by using an interferometric microscope and/or a confocal microscope (these two functions may be combined) in conjunction with an index matching fluid that approximately matches the refractive index of diamond at the measurement wavelength.

The outside surface may be measured first; the fluid is then placed between the first interferometric optical element, allowing the inner surface to be measured. Alternatively, two light wavelengths may be used, such that the index-matching fluid provides a closer match at one wavelength than the other, so that a stronger return of optical energy is obtained from the outer surface at one of the two wavelengths. By using two wavelengths of light to make the measurements, the outside and inside may be measured simultaneously or sequentially, relying on the change in effective index of refraction for a given matching fluid between two respective wavelengths of light. Such an operation can take place across a range of wavelengths (e.g., from about 10 nanometers to about 50 microns), depending on the material of which the capsule shell is formed. In addition, any coatings applied to the basic material of the capsule can be measured similarly. For instance, a diamond sphere with a SiC coating will exhibit wavelength related dependencies as reported in the above-referenced [MEMS]: Refractive index n=1.9-2.4 (wavelength not specified) for an alpha (SiC) PECVD film deposited with $SiH_4/CH_4$ flow ratio range=0.75-1.1, gas pressure=300 mTorr, RF power=150 W. With n=1.9-2.4 approximately matching the diamond (n approximately 2.418, with possible wavelength dependency), the SiC wavelength produces an index of around 2.4. In another embodiment, a partially matching fluid is used, and the interferometric system is arranged to have a very small depth of field of focus such that the outside surface can be distinguished by focus manipulation from the inside surface, allowing their relative concentricity to be measured.

While the invention has been described with respect to specific embodiments, one skilled in the art will recognize that numerous modifications are possible. One skilled in the art will also recognize that the invention provides a number of advantageous techniques, tools and products, usable individually or in various combinations. These techniques, tools and products include but are not limited to:

SPM measurement and modification at temperatures above about 70° C. or below about −40° C.; and/or AFM guided nanomachining at temperatures above about 70° C. or below about −40° C.; and/or AFM guided nanomachining of capsules or pellets; and/or SPM measurement and modification at temperatures above about 30° C. and below about 10° C.; and/or an SPM instrument with an integrated interferometric microscope; and/or an SPM instrument with an integrated microscope capable of interferometry; and/or an SPM instrument with reflecting imaging optics for wavelengths ranging from about 10 nm to about 2 mm; and/or an SPM instrument with reflecting imaging optics including a bandpass filter secondary reflector at its laser detection wavelength; and/or an SPM instrument having a piezoelectric stage with three axes of motion and a piezoelectric scanning head with three axes of motion; and/or an SPM instrument with a piezoelectric stage, where the sample platen is smaller in diameter then the cantilever length; and/or an SPM similar to any of the above in which the sample platen and the AFM cantilever are at right angles to each other; and/or a sample holder with a heater for an SPM or AFM instrument; and/or a sample holder with a surface acoustic wave generator for an SPM or AFM instrument; and/or an SPM instrument in which standing waves in the sample material due to surface acoustic waves are measured to determine local thermal or structural properties of a workpiece; and/or use of measurements of local thermal or structural properties measured by acoustic waves in making modifications including material addition or subtraction based on the acoustic standing waves; and/or a tip made of or coated with manganese, titanium, iron or other material having a carbon chemical or solubility affinity and usable at high temperatures to nanolap a diamond shape of any kind; and/or use of a heated tip made of or coated with diamond, titanium, platinum or other material having an affinity for hydrogen at very low temperatures to nanolap or thermally ablate solid material into a gas thus providing a properly shaped frozen surface; and/or any optical instrument for measuring hollow structures in which an index matching fluid is used and alternated with a substantially different index fluid or gas/vacuum to distinguish between the inner and outer surfaces and features of the structures; and/or any optical instrument for measuring hollow structures in which an index matching fluid is used and alternative wavelengths of light are employed with differing indexes in the index matching fluid to distinguish between the inner and outer surfaces and features of the structures; and/or any instrument which combines both of these operations; and/or any machining or polishing system in which a concentricity measurement is used to guide the removal of material on the outer surface of two surfaces (inner and outer) which are meant to have some given concentricity or alignment relationship.

Thus, although the invention has been described with respect to specific embodiments, it will be appreciated that the invention is intended to cover all modifications and equivalents within the scope of the following claims.

What is claimed is:

1. A scanning probe microscopy (SPM) system for making a modification to an object, the SPM system comprising:
   a sample stage adapted to hold an object to be modified;
   a cantilever disposed above the sample stage;
   an SPM probe mounted on the cantilever and configured to perform nanolapping on the object, thereby modifying the object;
   a positioning system configured to position the SPM probe with respect to the object held on the sample stage, wherein the sample stage and the positioning system are each thermally insulated, wherein respective temperatures of the sample stage and the positioning system are separately controllable, and wherein the object is held at a temperature greater than 30° C. or less than 10° C. during the nanolapping; and
   an enclosure substantially surrounding the stage, the SPM probe, the cantilever and the positioning system, wherein the enclosure provides thermal isolation for the SPM system.

2. The SPM system as claimed in claim 1, wherein the SPM probe comprises a tip, the tip being comprised of a material having a carbon chemical or solubility affinity.

3. The SPM system as claimed in claim 2, wherein the material having a carbon chemical or solubility affinity is selected from a group consisting of manganese, titanium, and iron.

4. The SPM system as claimed in claim 1, wherein the SPM probe comprises a tip, the tip being comprised of a material having an affinity for hydrogen.

5. The SPM system as claimed in claim 4, wherein the material having an affinity for hydrogen is selected from a group consisting of diamond, titanium, and platinum.

6. The SPM system as claimed in claim 1 wherein the object is held at a temperature near absolute zero during the nanolapping.

7. The SPM system as claimed in claim 1 wherein the object to be nanolapped is made at least in part of diamond.

* * * * *